United States Patent
Bristol (10) Patent No.: US 7,185,528 B2
(45) Date of Patent: Mar. 6, 2007

(54) SPEED AND FLUID FLOW CONTROLLER

(75) Inventor: L. Rodney Bristol, Chalfont, PA (US)

(73) Assignee: Scott Technologies, Inc., Boca Raton, FL (US)

( * ) Notice: Subject to any disclaimer, the term of this patent is extended or adjusted under 35 U.S.C. 154(b) by 0 days.

(21) Appl. No.: 11/270,351

(22) Filed: Nov. 7, 2005

(65) Prior Publication Data

US 2006/0053865 A1   Mar. 16, 2006

(51) Int. Cl.
*G01N 7/00* (2006.01)
*H02P 7/285* (2006.01)

(52) U.S. Cl. ..................... 73/31.03; 388/809
(58) Field of Classification Search ............... 73/31.03; 388/809
See application file for complete search history.

(56) References Cited

U.S. PATENT DOCUMENTS

| | | | |
|---|---|---|---|
| 3,588,654 A | 6/1971 | Balazs | |
| 3,683,253 A | 8/1972 | Rummel et al. | |
| 3,764,869 A * | 10/1973 | Woodbury | 318/138 |
| 3,803,470 A | 4/1974 | Vesteen | |
| 3,873,814 A | 3/1975 | Mirdadian | |
| 3,950,989 A | 4/1976 | Meirowitz | |
| 4,241,299 A | 12/1980 | Bertone | |
| 4,292,574 A * | 9/1981 | Sipin et al. | 388/822 |

(Continued)

FOREIGN PATENT DOCUMENTS

| | | |
|---|---|---|
| EP | 000071848 A1 | 2/1983 |
| JP | 63223446 A | 9/1988 |

*Primary Examiner*—Hezron Williams
*Assistant Examiner*—John Fitzgerald
(74) *Attorney, Agent, or Firm*—Rick Comoglio; Dean D. Small; Small Patent Law Group (57) ABSTRACT

A system and method for measuring fluid flow rate in a system where fluid is pumped, such as a gas monitoring instrument where gas is pumped from a space such as a room or enclosure through a conduit to a sensor. The flow of gas through a pump is determined by measuring motor back-e.m.f. which is proportional to motor speed. In a system where motor speed is regulated by pulse width modulation of the motor drive voltage, the back-e.m.f. is sampled during intervals between the drive pulses applied to the motor, and in a further aspect the sampling is done at selected, spaced-apart or infrequent intervals such as once for every ten or once for every hundred motor drive pulses. Advantageously, in an instrument that uses a microprocessor and analog-to-digital converter to measure gas-concentration, the same microprocessor and converter can provide the PWM control of the pump, in response to the back-e.m.f. generated by the pump motor between the drive pulses. The microprocessor compares the output of the analog-to-digital converter, corresponding to the back-e.m.f., which in turn corresponds to the pump motor speed, to a set-point value, representative of the desired pump motor speed. The processor then adjusts the PWM to control the pump motor to achieve and maintain the desired speed. As a result, in a gas monitor, the gas-flow rate may be maintained close to a desired gas flow rate regardless of the voltage supplied by the battery or other voltage source, regardless of the degree to which the gas is filtered, and under a wide range of operating conditions.

36 Claims, 4 Drawing Sheets

U.S. PATENT DOCUMENTS

| | | | |
|---|---|---|---|
| 4,384,825 A | 5/1983 | Thomas et al. | |
| 4,527,953 A | 7/1985 | Baker et al. | |
| 4,638,233 A | 1/1987 | Erdman | |
| 4,884,013 A | 11/1989 | Jackson et al. | |
| 4,893,067 A | 1/1990 | Bhagwat et al. | |
| 4,897,587 A * | 1/1990 | DiGiulio et al. | 318/625 |
| 5,048,115 A | 9/1991 | Venturino | |
| 5,107,713 A | 4/1992 | Peck et al. | |
| 5,520,517 A * | 5/1996 | Sipin | 417/44.3 |
| 5,601,413 A | 2/1997 | Langley et al. | |
| 5,714,862 A | 2/1998 | Mikesell et al. | |
| 5,811,946 A * | 9/1998 | Mullin et al. | 318/254 |
| 6,085,576 A * | 7/2000 | Sunshine et al. | 73/29.01 |
| 6,363,802 B1 | 4/2002 | Grippo et al. | |
| 6,402,478 B1 | 6/2002 | Zhang et al. | |
| 6,640,417 B2 * | 11/2003 | Leitz et al. | 29/596 |
| 6,745,083 B2 * | 6/2004 | Eckardt et al. | 700/2 |
| 6,765,412 B1 * | 7/2004 | Schottler et al. | 326/83 |
| 6,836,386 B2 * | 12/2004 | Koski | 360/73.11 |
| 6,981,402 B2 * | 1/2006 | Bristol | 73/31.03 |
| 7,091,685 B2 * | 8/2006 | Makaran | 318/434 |
| 2005/0046375 A1* | 3/2005 | Maslov et al. | 318/650 |
| 2005/0162114 A1* | 7/2005 | Makaran | 318/434 |

\* cited by examiner

SPEED AND FLUID FLOW CONTROLLER

CROSS REFERENCE TO A RELATED APPLICATION

Applicant claims priority based an U.S. provisional patent application No. 60/384,688, filed May 31, 2002, titled "SPEED AND FLUID FLOW CONTROLLER", and non-provisional patent application Ser. No. 10/452,040, filed May 20, 2003 titled "SPEED AND FLUID FLOW CONTROLLER", both of which are incorporated herein by reference in their entireties.

BACKGROUND OF THE INVENTION

In a basic gas monitoring instrument, an electrically powered motor drives a pump to bring a sample of gas from a region or space, typically via a flexible conduit or tubing, to a sensor so that the sample of gas can be tested for a contaminant. The flow rate is affected by the fluid dynamics of the system, which can change from time to time. When the flow through the system is not constant, the gas monitoring instrument is not predictable in its operation. Prior art systems operate the pump at a flow rate greater than required to insure that the minimum required flow rate is obtained. Accordingly, it would be desirable to provide a system wherein a minimum steady flow is maintained in a manner consuming only that amount of energy necessary to maintain the minimum steady flow and even when there is resistance to flow in the system. It also would be desirable to provide such a system wherein a more reliable indication of a low flow condition is given than is provided in existing prior art gas monitoring instruments.

The characteristic response time of the gas monitoring system must be known so that the user can determine when a valid test of the safety or technical compliance of a space has been made. When a potentially hazardous space is monitored, the response time of the monitoring system is a critical parameter for the safety of persons in or entering the monitored space. In some situations, a gas-containing enclosure is monitored for compliance to specific technical requirements. The characteristic flow rate and corresponding response time of a given configuration may be determined by laboratory testing. The measured response times of various configurations are usually repeatable in field applications, provided the tested flow rate is maintained.

In a monitoring instrument having a positive-displacement pump driven by a direct current motor, an obstruction of the gas flow will result in an increased electric current through the motor. Common design practice with such pumps is to sense the motor current and indicate a "low-flow" condition when the current exceeds a predetermined limit. However, this method has a serious drawback. Motor current corresponds not only to flow obstruction, but also to such variables as motor and pump friction, lubricant temperature, diaphragm stiffness, and battery voltage. The uncertainty of the motor current at the desired threshold of minimum flow is so great that it is often necessary to indicate obstructions of the gas flow by detecting short-term increases in motor current. As a result, low-flow is indicated only when rapid decreases of the gas flow occur, such as may result from pinched tubing or pressing the probe against a flat surface. This method leaves the user exposed to the risk of undetected hazards when gas flow decreases gradually, such as by the accumulation of particles in protective filters. Such accumulation may occur over a few minutes or many days, depending on the application.

User safety and confidence may be enhanced by low-flow detection that operates independently of the rate at which gas flow declines. A gas flow sensor placed in the path of the sampled gas could provide the needed indication. Gas flow sensors employ various techniques, including differential pressure across a known flow restriction, rotation rate of a turbine, and thermal convection (mass flow). Such sensors add cost and bulk to the apparatus.

SUMMARY OF THE INVENTION

A system and method for measuring fluid flow rate to determine the response time in a system where fluid is pumped, such as a gas monitoring instrument where gas is pumped from a space such as a room or enclosure through a conduit to a sensor. The invention uses the relation between pump motion, i.e., the speed at which the pump is driven by the pump motor, and flow of gas through a pump. The invention measures the speed of the pump motor by measuring motor back-e.m.f. which is proportional to motor speed.

In a system where motor speed is regulated by Pulse Width Modulation (PWM) of the motor drive voltage, the back-e.m.f. is sampled during intervals between the drive pulses applied to the motor. The invention improves such a system by sampling the back-e.m.f. at a rate lower than the pulse rate of the modulated drive pulses. Back-e.m.f. sampling may occur only once for ten or 100 drive pulses, for example. The reduced sampling rate permits the duty factor of the drive pulses to approach 100 percent, thereby making efficient use of voltage sources such as batteries.

Advantageously, in an instrument that uses a microprocessor and analog-to-digital (A/fl) converter to measure gas-concentration, the same microprocessor and converter can provide the PWM control of the pump, in response to the back-e.m.f. generated by the pump motor between the drive pulses. The microprocessor compares the output of the analog-to-digital converter, corresponding to the back-e.m.f., which in turn corresponds to the pump motor speed, to' a set-point value, representative of the desired pump motor speed. The processor then adjusts the PWM to control the pump motor to achieve and maintain the desired speed. As a result, in a gas monitor, the gas-flow rate may be maintained close to a desired gas flow rate regardless of the voltage supplied by the battery or other voltage source, regardless of the degree to which the gas is filtered, regardless of the loading of the filter, and under a wide range of operating conditions.

The foregoing and additional advantages and characterizing features of the invention will become clearly apparent upon a reading of the ensuing detailed description together with the included drawings.

DETAILED DESCRIPTION OF THE INVENTION

Figure 1:
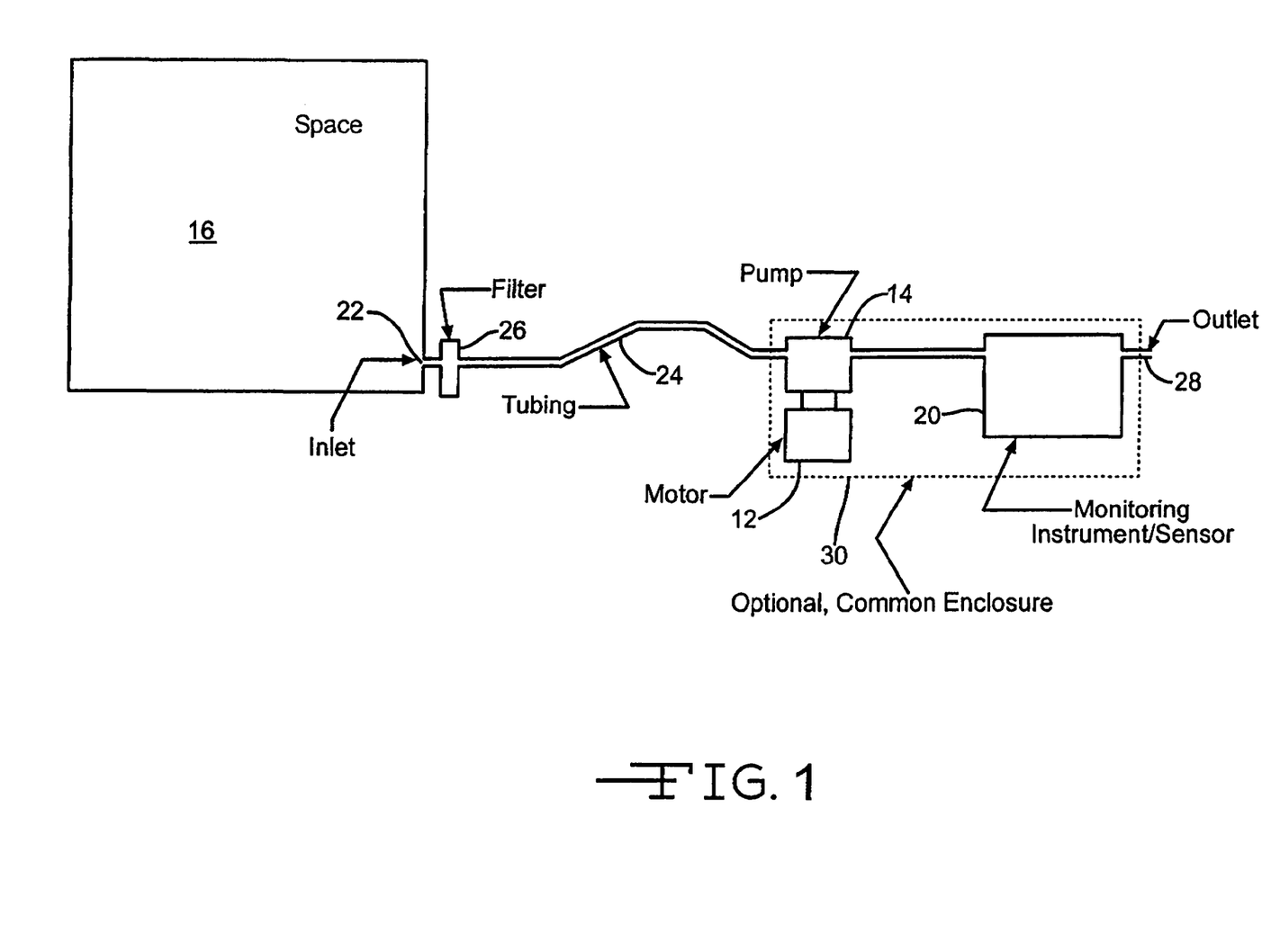
FIG. 1 is a schematic diagram illustrating a gas monitoring instrument to which the invention is applicable.

FIG. 1 is a schematic of part of a gas monitoring instrument 10 to which the present invention is applicable. The invention is not limited to a gas monitoring instrument, and the invention may be used to monitor other fluids, for example, liquids. The invention is merely illustrated using a gas monitoring instrument as an example of how the invention might be implemented. The gas monitoring instrument has, an electrically powered motor 12 for driving a pump 14 to bring a sample of gas from a region or space 16, such as a room or pipe, to. a sensor 20, so that the sample of gas can be tested for a contaminant. A gas inlet 22 or probe in the space 16 being tested is in gas communication with the monitoring instrument through flexible tubing 24, usually ranging from 1 meter to 30 or more meters in length. One or more filters 26 may be placed at the inlet and in the tubing to exclude particles and liquids, which could degrade the function of the tubing, the pump, or the instrument. Gas leaves the sensor via outlet 28. In the arrangement illustrated in FIG. 1, motor 12, pump 14 and sensor 20 can be housed in a common enclosure 30. Such a gas monitoring system has a characteristic response time that is primarily determined by the volume of gas contained in the tubing 24, divided by the volumetric pumping rate of the pump 14. The flow rate is affected by the fluid dynamics of the system, which may change from time to time.

The invention uses the relation between pump motion and the flow of gas through a pump. Depending on the construction of the pump, the volume of fluid may correspond, for example, to the number of strokes of a piston or the, number of strokes of a diaphragm, the number of rotations of an enclosed screw, or the number of rotations of a set of articulated vanes that are arranged in an eccentric chamber to modulate the volume enclosed by adjacent vanes and the walls of the chamber through each revolution, or any other pump mechanism that moves a relatively fixed volume of material per cycle. An inertial pump, such as a fan or a centrifugal water pump, is less suited to the disclosed method, because under certain conditions the speed of rotation may increase with restricted flow.

Methods exist for measuring the speed at which a pump is driven. For example, a proximity sensor, electrical contact, or optical path interrupter may be used to count strokes of a reciprocating pump, such as a diaphragm pump. If a pump is driven by a reciprocating electromechanical driver, such as a solenoid or linear motor, the pumped volume may be determined by counting the number of cycles of the reciprocating drive. For pumps driven by rotary motors, the rotations of the system may be sensed by similar means as for reciprocating drivers, such as proximity, electrical contact, or optical sensing of one or more index features of the mechanism. Such techniques are employed in shaft encoders and tachometers. These techniques add cost and bulk to the apparatus.

A method for measuring motor speed according to the invention, from which the flow through a driven pump may be determined, is to sense the voltage generated by the motor during short interruptions of the driving voltage. An electric motor, such as those used to drive pumps associated with gas monitoring instruments, behaves as a generator when mechanically driven or when coasting as a result of inertia. When the mechanical drive is the inertia of the system, the voltage generated by the motor (which is sometimes referred to as "voltage of motion" or "back-e.m.f."), indicates how fast the motor is moving (usually turning). In a typical direct-current motor, the back-e.m.f. opposes the applied voltage such that a heavily loaded (slower turning) motor draws more current than a lightly loaded one.

The "back-e.m.f." is proportional to the speed of the motor and, typically, opposes the voltage applied externally to the motor. When the driving voltage is removed from a motor, system inertia maintains the motion of the motor and the voltage appears at the motor terminals. The voltage-of-motion is measurable after the effects of parasitic inductance and capacitance have decayed and before the speed of the motor has slowed appreciably.

A method according to the invention may be employed in a system where the speed of the pump is regulated by pulse-width-modulation (PWM) of the drive voltage. PWM is a well-known control method for adapting a varying voltage supply, such as a battery, to a known or varying load. In application to a portable, battery-powered gas monitor, the gas-flow rate may be maintained close to a desired gas flow rate regardless of the voltage supplied by the battery, regardless of the degree to which the gas is filtered, and under a wide range of operating conditions.

A method according to the invention may be advantageous in an instrument that uses a microprocessor and analog-to-digital converter to measure gas-concentration. The same microprocessor and converter can provide PWM control of the pump, in response to the back-e.m.f. generated by the pump motor between the drive pulses. The microprocessor compares the output of the analog-to-digital converter to a set-point value. The AID output corresponds to the back-e.m.f., which corresponds to the pump motor speed. The set-point value corresponds to the desired pump motor speed which' corresponds to the desired flow rate. The processor then adjusts the PWM to control the pump motor to achieve and maintain the desired speed. The processor also coordinates the timing of the back-e.m.f. measurements with the PWM.

Figure 2:
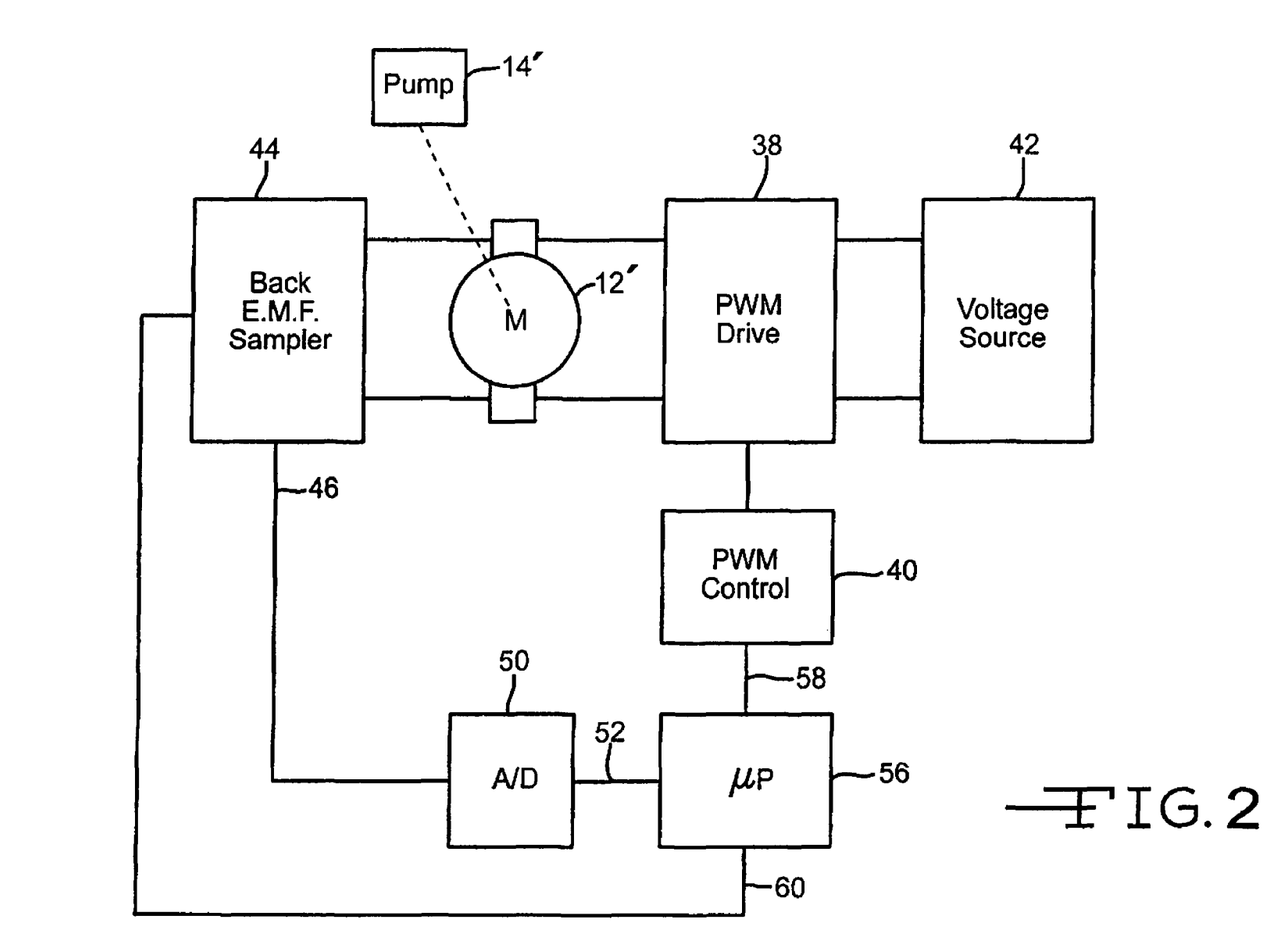
FIG. 2 is a schematic diagram of the motor control arrangement according to the invention.

Referring to FIG. 2, the foregoing is illustrated with motor 12' and pump 14' which are similar to the motor and pump included in the monitoring instrument of FIG. 1. A pulse width modulation (PWM) drive 38 is connected between a source of voltage 42, such as a battery, and motor 12' and a pulse width modulation. (PWM) control 40 is operatively associated with PWM drive 38 for controlling application of motor drive pulses to motor 12'. PWM drive 38 and PWM control 40 are representative of such components readily commercially available and well-known to those skilled in the art so that a detailed description thereof is unnecessary. Suffice it to say, PWM drive 38 under control of PWM control 40 supplies drive voltage pulses to motor 12' of increasing or decreasing pulse width and/or pulse frequency when it is desired to deliver increasing or decreasing power, respectively, to motor 12' to increase or decrease the speed thereof and thereby to control the rate of flow through the system. Accordingly, the term pulse width modulation (PWM) used herein is intended to include the foregoing modes of variable pulse width and/or frequency and/or pulse magnitude so as to change the driving power to the motor, as well understood by those skilled in the art.

A voltage sampler, labeled back-e.m.f. sampler 44 in FIG. 2, is connected to motor 12' for sampling motor back-e.m.f. during intervals between drive pulses applied to motor 12' to provide a signal at the output 46 thereof which is indicative of the actual speed of motor 12'. Sampler 44 is representative of voltage sampling devices readily commercially available and well-known to those skilled in the art so that a detailed description thereof is unnecessary.

The output 46 of back-e.m.f, sampler 44 is applied to the input of an analog to digital (A/fl) converter 50 to provide a digital signal at the output 52 thereof which contains information on the actual speed of motor 12', i.e. a digital representation of the motor speed. A/D converter 50 is representative of A/fl converters readily commercially available and well-known to those skilled in the art so that a detailed' description is unnecessary.

The output 52 of A/fl converter 50 is applied to an input of a microprocessor 56 which is connected in controlling relation to PWM control 40. Microprocessor 56 compares the actual motor speed as represented by the digital signal on A/fl converter output 52 to a desired motor speed programmed into microprocessor 56 and provides a control signal on output 58 corresponding to the difference between actual and desired motor speed. Output 58 is applied to £4~M control 40 to cause the width of motor drive pulses to be increased or decreased to increase to decrease the motor speed depending upon the nature of the difference between actual and desired motor speeds. Another control signal output 60 from microprocessor 56 is applied to back-e.m.f. sampler 44 for a purpose which will be described. Microprocessor 56 is representative of such processors readily commercially available and well-known to those skilled in the art so that a detailed description thereof is unnecessary. By way of example, in an illustrative gas monitoring instrument, microprocessor 56 can be a programmable digital controller commercially available from Texas Instruments under the designation MSP430fl49.

Although the back-e.m.f may be sampled during some or all the intervals between drive pulses, in accordance with a feature of the invention the back-e.m.f. is sampled at spaced-apart or infrequent intervals between motor drive pulses. In other words, the back-e.m.f. is sampled at a rate lower than the pulse rate of the modulated motor drive pulses. For example, the voltage that corresponds to the gas flow rate may be sampled once for every ten or once for every hundred drive pulses. This one pulse of ten or 100 may be reduced' in width or eliminated as needed by the processor to permit an accurate sample of the back-e.m.f. The other nine or 99 pulses may be as wide as needed to, maintain pump motor speed. The ratio of PWM frequency to sample frequency need not be constant. It may be determined by the timing characteristics of the processor and A/fl converter and by the rate of sampling needed to maintain adequate pump motor speed stability, according to well-known engineering principles. Microprocessor 56 selects the particular intervals between motor drive pulses during which back-e.m.f. is to be sampled, this being determined by a program stored within microprocessor 56. Control or timing signals for accomplishing this are on output 60 which is applied in controlling relation to back-e.m.f. sampler 44.

Advantageously, back-e.m.f. sampler 44, A/D converter 50 and PWM control 40 may be incorporated in the microprocessor. When the elements are so combined, control lines 58 and 60 represent control data and timing signals within the microprocessor, which may be coordinated using software, according to information published by the manufacturer of the microprocessor. One such publication is the "MSP43Oxlxx Family User's Guide", Texas Instruments document number SL.AUO49A. Likewise, an A/fl converter may be arranged such that it provides the back-e.m.f sampling, in which case the path 46 becomes a signal path internal to the A/fl converter.

Figure 3:
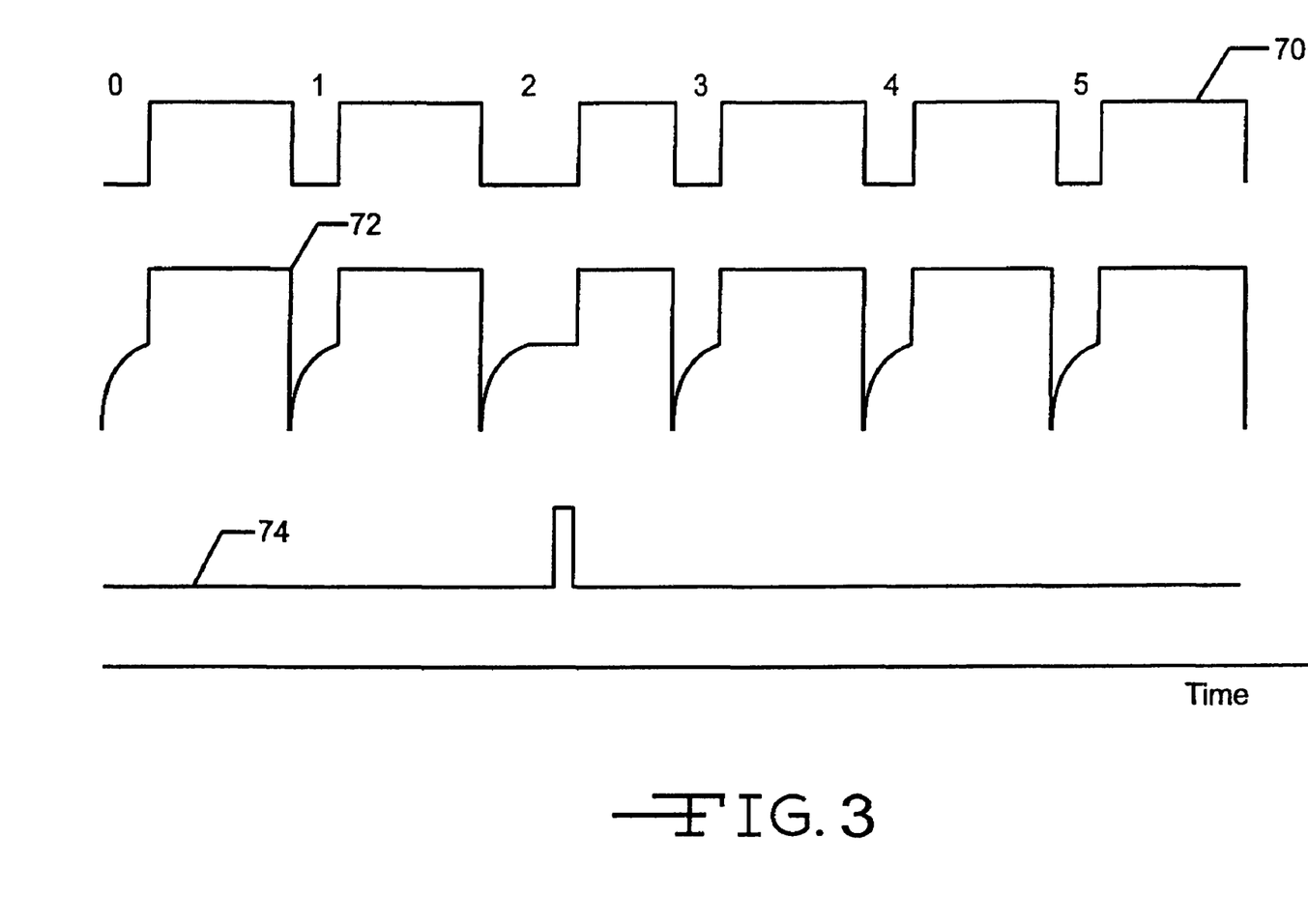
FIG. 3 is a graph including waveforms illustrating operation of the arrangement of FIG. 2.

The foregoing is illustrated by the waveforms presented in FIG. 3 wherein pulse-width modulated motor drive pulses are represented by waveform 70. The voltage appearing on the terminals of motor 12', from which back-e.m.f. can be determined, is represented by waveform 72. Waveform 74 shows control or timing pulses provided by microprocessor output 60 for causing back-e.m.f. sensor 44 to sample the motor back-e.m.f. only during selected and spaced-apart intervals between motor drive pulses. Successive intervals between motor drive pulses are numbered 0 through 5 at waveform 70. Interval 2 is extended to permit full recovery of the back-e.m.f. and provide sufficient time for back-e.m.f. sampling, according to properties of the motor and sampling circuit (FIG. 2-*motor* 12' and Back-e.m.f. Sampling 44). This is provided by a program stored in microprocessor 50. The pulse in waveform 74 indicates sampling back-e.m.f. accurately, during extended interval 2. The microprocessor commands PWM control 40 to delay the onset of such drive pulses under conditions when speed regulation would otherwise generate the drive pulse during the time when back-e.m.f. is measured. Nevertheless, the majority of drive pulses are unaffected by the sampling-time requirement, so that nearly all the voltage source is available to drive the motor.

By using the back-e.m.f to adjust the PWM controlling the pump motor, battery run time may be extended because only as much energy is drawn from the battery as is needed. Further, it permits the use of an optimal pump and motor for the lowest battery voltage, without risk of damage at the highest battery voltage. Also, such a system reliably indicates low gas-flow rates, by reporting when the P1*1 can not sustain the target motor speed, thereby avoiding the hazard common in prior instruments resulting from the gradual onset of low flow.

Figure 4:
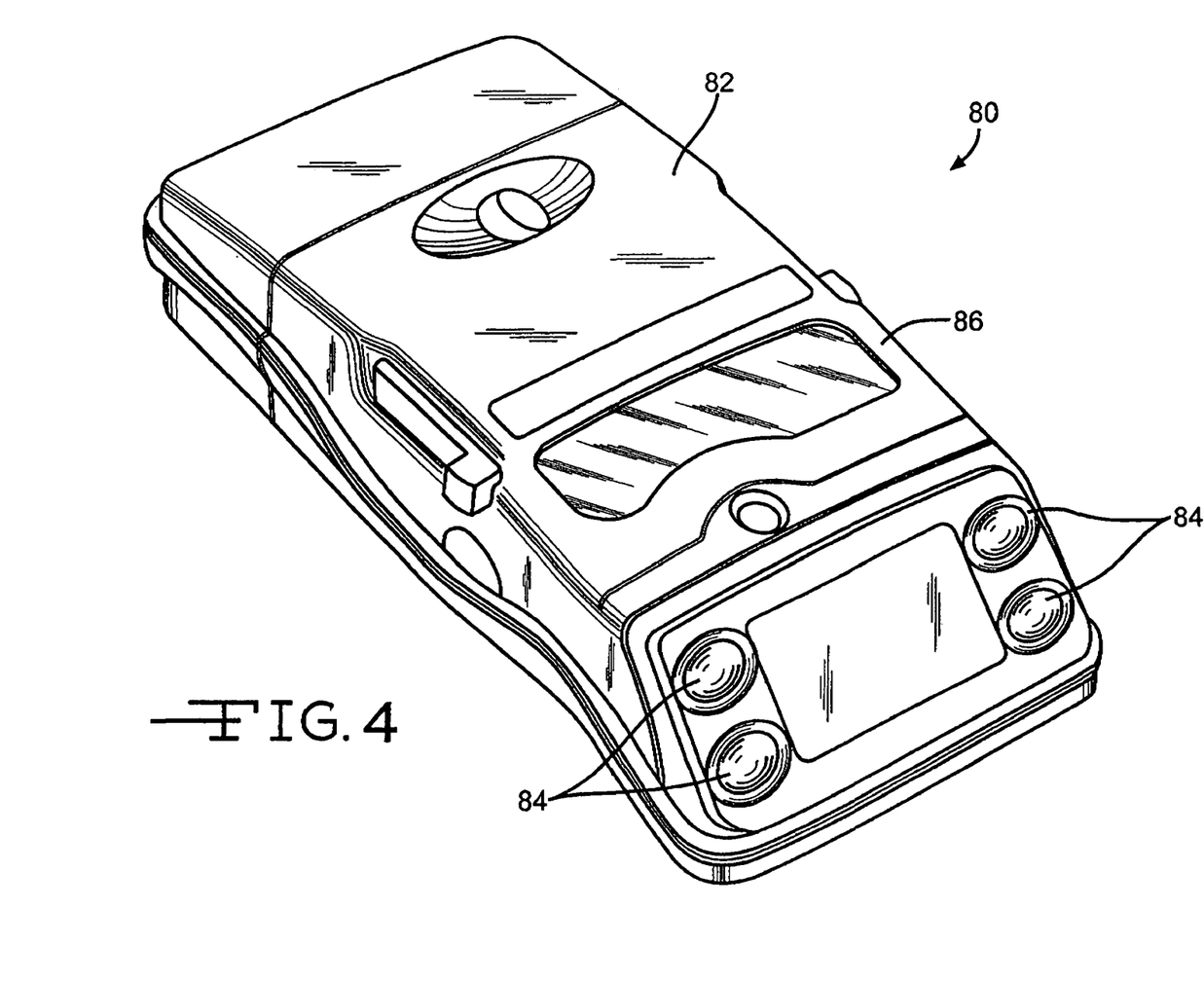
FIG. 4 is a perspective view of a form of gas monitoring instrument incorporating the invention.

FIG. 4 illustrates a portable, hand-held gas monitoring instrument 80 incorporating the invention. A housing 82 is the counterpart of enclosure 30 shown in FIG. 1, and housing 82 is of a size and shape such that instrument 80 can be hand-held and portable. A motor, pump, sensor and the arrangement of FIG. 2 are included within housing 82 which is provided with a port into which can be fitted a length of flexible tubing similar to tubing 24 of FIG. 1. The voltage source is a battery which also is included within housing 82. Various control buttons 84 are provided as one end of device 80 and a display 86 is located on housing 82 near the control buttons 84.

Although embodiments of the invention have been described herein, the invention is not limited to such embodiments. The claims which follow are directed to the invention, and are intended to further describe the invention, but are not intended to limit the scope of the invention.

What is claimed is:

1. A gas monitoring apparatus, comprising:
   a sensor testing gas samples for contaminants;
   a pump communicating with the sensor, the pump providing the gas samples to the sensor;
   a motor driving the pump;
   a motor driver providing drive signals to the motor to control operation of the motor; and
   a sampling unit sampling motor back electromagnetic force (EMF) during intervals between the drive signals, the motor driver adjusting the drive signals based on the back EMF sampled, wherein the motor driver comprises a controller that, during sampling of the back EMF, at least one of delays the onset of at least one drive pulse of the drive signals, increases an interval between two adjacent drive pulses, reduces a width of at least one of the drive pulses, and eliminates at least one of the drive signals.

2. The apparatus of claim 1, wherein the motor driver comprises a pulse width modulation (PWM) drive that applies PWM pulses to the motor as the drive signals.

3. The apparatus of claim 1, wherein the motor driver increases and decreases one of pulse width, frequency and amplitude of the drive signals, at different times, to increase and decrease, respectively, a flow rate of the gas samples through the sensor.

4. The apparatus of claim 1, wherein the sampling unit continuously adjusts the drive signals to adjust continuously a speed of the motor such that gas samples are provided at a substantially steady flow rate to the sensor.

5. The apparatus of claim 1, further comprising a microprocessor that calculates an actual motor speed and compares the actual motor speed with a desired motor speed, and based thereon, adjusts the drive signals to change the actual motor speed.

6. The apparatus of claim 1, wherein the sampling unit samples of the back EMF at spaced apart intervals between the drive signals at a rate lower than a pulse rate associated with the drive signals.

7. The apparatus of claim 1, wherein the sampling unit samples the back EMF at infrequent intervals between the drive signals.

8. The apparatus of claim 1, further comprising a microprocessor providing a control signal to the motor driver and providing control pulses to the sampling unit to direct the sampling unit to sample the back EMF of the motor.

9. The apparatus of claim 1, wherein the controller adjusts at least one of a pulse width, frequency, and amplitude of the drive signals based on the back EMF.

10. A gas monitoring apparatus, comprising:
a sensor testing gas samples for contaminants;
a pump communicating with the sensor, the pump providing the gas samples to the sensor;
a motor driving the pump;
a motor driver providing drive signals to the motor to control operation of the motor; and
a sampling unit sampling motor back electromagnetic force (EMF) during intervals between the drive signals, the motor driver adjusting the drive signals based on the back EMF sampled, wherein the motor driver generates drive signals separated by different first and second intervals, the second interval being longer than the first interval, the sampling unit sampling the back EMF during the second interval.

11. The apparatus of claim 1, further comprising a battery providing power to the motor through the motor driver.

12. The apparatus of claim 1, wherein the sensor, motor, pump, motor driver and sampling unit are housed within a common handheld portable housing.

13. The apparatus of claim 1, further comprising a housing holding therein the sensor, motor, pump, motor driver and sampling unit, the housing including a port configured to draw in the gas samples.

14. The apparatus of claim 1, further comprising a housing having a port therein, the port being fitted with a length of flexible tubing having an outer end configured to receive the gas samples.

15. The apparatus of claim 1, further comprising a filter joined to the pump, the filter having an inlet configured to receive the gas samples.

16. The apparatus of claim 1, further comprising a housing having control buttons provided on the housing, the control buttons being configured to control operation of the apparatus.

17. The apparatus of claim 1, further comprising a housing having a display located on the housing, the display presenting information indicative of a result of testing of the gas samples for contaminants.

18. The apparatus of claim 1, further comprising a microprocessor and a display, the microprocessor determining a low flow condition when a target motor speed is not maintained, the display providing an indication of the low flow condition.

19. A method for controlling a gas monitoring apparatus having a sensor, a pump for providing gas samples to the sensor, and a motor for driving the pump, the method comprising:
driving the pump with the motor to provide gas samples to the sensor at a predetermined flow rate;
testing the gas samples at the sensor for contaminants;
generating drive signals to power the motor;
sampling back electromagnetic force (EMF) of the motor during intervals between the drive signals;
adjusting the flow rate of gas samples to the sensor by changing the drive signals based on the back EMF sampled from the motor; and
determining a low flow condition, based on the back EMF sampled, when a target motor speed is not maintained and displaying information indicating the low flow condition.

20. The method of claim 19, wherein the generating includes providing the drive signals as a series of pulse width modulated pulses.

21. The method of claim 19, wherein the adjusting includes adjusting at least one of a pulse width, frequency and amplitude of the drive signals based on the back EMF.

22. The method of claim 19, wherein the adjusting includes increasing and decreasing one of pulse width, frequency and amplitude of the drive signals, at different times, to increase and decrease, respectively, a flow rate of the gas samples through the sensor.

23. The method of claim 19, wherein the adjusting includes continuously adjusting the drive signals to adjust continuously a speed of the motor such that the gas samples are provided at a substantially steady flow rate to the sensor.

24. The method of claim 19, further comprising calculating an actual motor speed and comparing the actual motor speed with a desired motor speed, and based thereon, adjusting the drive signals to change the actual motor speed.

25. The method of claim 19, further comprising sampling the back EMF at spaced apart intervals between the drive signals at a rate lower than a pulse rate associated with the drive signals.

26. A method for controlling a gas monitoring apparatus having a sensor, a pump for providing gas samples to the sensor, and a motor for driving the pump, the method comprising:
driving the pump with the motor to provide gas samples to the sensor at a predetermined flow rate;
testing the gas samples at the sensor for contaminants;
generating drive signals to power the motor;
sampling back electromagnetic force (EMF) of the motor during intervals between the drive signals; and
adjusting the flow rate of gas samples to the sensor by changing the drive signals based on the back EMF sampled from the motor, wherein the drive signals are separated by different first and second intervals, the second interval being longer than the first interval, the sampling of the back EMF samples occurring during the second interval.

27. The method of claim 19, further comprising displaying information indicative of a result of testing of the gas sample for contaminants.

28. A handheld portable gas monitoring instrument, comprising:
a housing sized and shaped to be handheld and portable;
a battery for powering the instrument;
a sensor for testing gas samples for contaminants;

a pump, provided in the housing and communicating with the sensor, the pump providing the gas samples to the sensor;

a motor, provided in the housing, for driving the pump;

a motor driver for providing drive signals to the motor to control operation of the motor;

a sampling unit for sampling motor back electromagnetic force (EMF) during intervals between the drive signals, the motor driver adjusting the drive signals based on the back EMF sampled; and a microprocessor determining a low flow condition when a target motor speed is not maintained.

29. The instrument of claim 28, wherein the motor driver comprises a controller that adjusts at least one of a pulse width, frequency and amplitude of the drive signals based on the back EMF.

30. The instrument of claim 28, further comprising a microprocessor that calculates an actual motor speed and compares the actual motor speed with a desired motor speed, and based thereon, adjusts the drive signals to change the actual motor speed.

31. The instrument of claim 28, wherein the sampling unit samples of the back EMF at spaced apart intervals between the drive signals at a rate lower than a pulse rate associated with the drive signals.

32. The instrument of claim 28, further comprising a microprocessor providing a control signal to the motor driver and providing control pulses to the sampling unit to direct the sampling unit to sample the back EMF of the motor.

33. The instrument of claim 28, further comprising a port located in the housing, the port being fitted with a length of flexible tubing having an outer end configured to receive the gas samples.

34. The instrument of claim 28, further comprising control buttons located on the housing, the control buttons being configured to control operation of the instrument.

35. The instrument of claim 28, further comprising a display located on the housing, the display presenting information indicative of a result of testing of the gas samples for contaminants.

36. The instrument of claim 28, further comprising a display located on the housing, the display providing an indication of the low flow condition.

* * * * *